Jan. 12, 1932.  G. W. WILSON, JR  1,840,341
WINDSHIELD CLEANER
Filed July 26, 1929
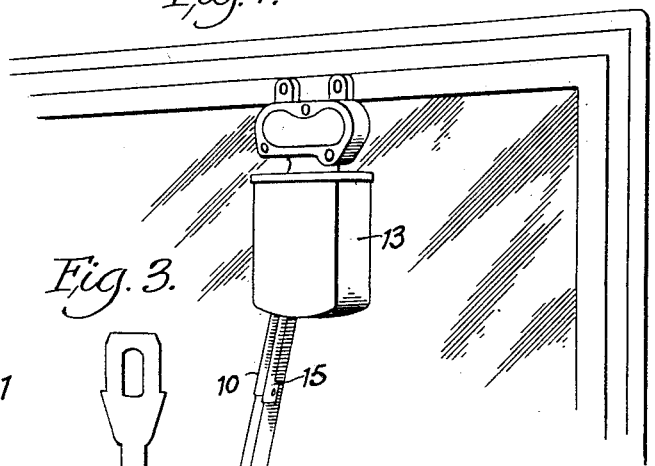
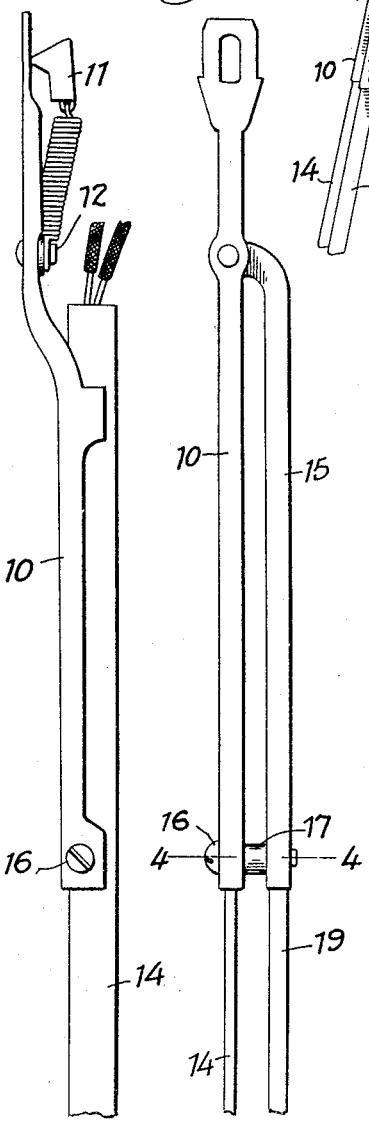
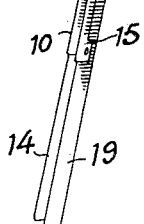
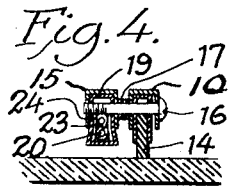
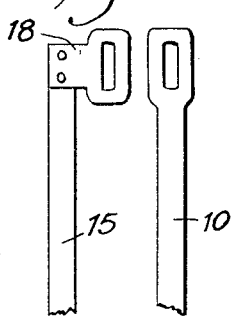
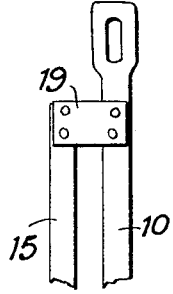
INVENTOR.
George W. Wilson, jr.,
BY
Eugene C. Taylor
ATTORNEY.

Patented Jan. 12, 1932

1,840,341

UNITED STATES PATENT OFFICE

GEORGE WIRT WILSON, JR., OF ELKINS, WEST VIRGINIA

WINDSHIELD CLEANER

Application filed July 26, 1929. Serial No. 381,370.

My invention relates to improvements in windshield wipers or cleansers of the type employed for cleaning windshields of automobiles or the like vehicles and which are operated either manually or automatically.

It is an object of the invention to provide in conjunction with a simple type of wiper arm and wiper a simple and inexpensive heating element mounted to operate with the wiper arm and wiper and of substantially the same length in order to enhance the effectiveness of the device so that it will function to remove incrustations formed by the freezing of moisture or the like on the windshield.

I accomplish the above by the provision of a conventional type of windshield wiper and the addition, in substantially parallel relation thereto, of a heater supporting arm carried by the wiper arm or connected to the same in any desired manner to cause it to operate with the wiper arm as a unit, a heating element being mounted in the heater supporting arm.

Referring to the accompanying drawings made a part hereof and on which some of the reference characters indicate similar parts, Fig. 1 is a perspective illustrating the application of the invention, Fig. 2, a side elevation, Fig. 3, a front elevation, Fig. 4, a section on the line 4—4 of Fig. 3, and Figs. 5 and 6, detail views of modified forms of attaching means.

As shown on the drawings reference character 10 indicates a conventional type of wiper arm which is detachably connected, by a spring clip 11 pivoted at 12 on the arm, to an operating shaft not shown which may be actuated by any desired means as for example by an electric motor 13. The inner end portion of the wiper arm 10 is offset in order to extend across the upper windshield frame and space the remaining portion of the arm inwardly to cause a wiper 14 pivoted therein to snugly engage the surface to be cleaned. The wiper is loosely pivoted in its supporting arm to permit it to conform to the surface wiped.

In carrying out my invention I provide a heater supporting arm 15 similar to the wiper arm 10 and mounted beside the same in spaced substantially parallel relation. The heater supporting arm is secured by the pivot or screw 16 to the wiper 14 and is spaced from the wiper arm by a sleeve 17. This spaced arrangement provides a clear and substantially unobstructed vision. The rear end portion of the heater supporting arm 15 may be connected to the wiper arm 10 in any desired manner, as for example to the pivot 11, as shown in Fig. 3, to the operating shaft 12, or as shown in Figs. 5 and 6 by brackets 18 or 19.

The pivot or screw 16 is threaded through both arms 10 and 15 and forms a pivotal support for both the wiper and the heating element. The arms 10 and 15 are of substantially the same cross-sectional dimensions each being U-shaped in such section to receive its respective element.

The heating element consists of a casing 19, of light weight material as for example aluminum, which houses a nichrome resistance wire 20 preferably of a size to furnish the desired heat, as for example size 22 B and S gauge, and said resistance wire extends from one end of the casing 19 through the same and back so that both terminals emerge from the same end of the casing. The parallel sections of the resistance wire are preferably disposed in superposed relation in order to conserve space so that they may fit in a narrow casing and said sections are separated from themselves by an S-shaped insulating sheath 23 of mica or the like, and also insulated from the metal forming the casing by sheets 24 of similar material.

That portion of the casing 19 which is disposed next to the surface to be heated and cleaned is flattened to provide a relatively broad enlarged heating surface and the dimensions of the casing are such that when the device is in operative position, as shown, the rubber part of the wiper blade will maintain the broad flat surface of the casing slightly spaced from the windshield glass and thus prevent the metal from scratching the same.

My device is designed to be operated on any 6 volt battery system and only requires substantially 5 amperes for its maintenance or to furnish sufficient power for the motor and the heating element. Also I preferably utilize a heating element substantially $7\frac{1}{4}$ inches in length in which is incorporated a resistance wire of twice such length. However it will be readily understood that the device may with slight modification be adapted for other systems and uses and therefore what I have shown and described is merely for the purpose of illustration and in no way for the purpose of limiting the invention.

I claim:

A windshield wiper comprising a pair of spaced parallel supporting arms supported to reciprocate adjacent the front face of a windshield glass, a connection between the inner end portions of said arms, a flexible wiper attached to the outer end of one of said arms by pivot means, the outer ends of said arms being connected by said pivot means, and a heater member mounted in and carried by and parallel with the other of said arms.

In testimony whereof I affix my signature.

GEORGE WIRT WILSON, JR.